Figure 1:
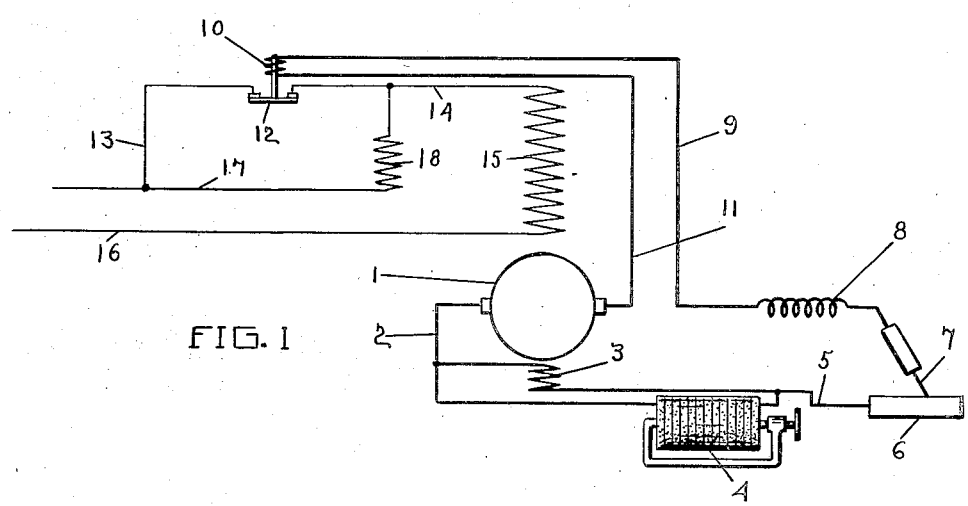

J. F. LINCOLN.
ARC WELDING APPARATUS.
APPLICATION FILED DEC. 23, 1915.

1,224,307.

Patented May 1, 1917.

James F Lincoln Inventor

By [signature] Attorney

UNITED STATES PATENT OFFICE.

JAMES F. LINCOLN, OF CLEVELAND, OHIO.

ARC-WELDING APPARATUS.

1,224,307.  Specification of Letters Patent.  Patented May 1, 1917.

Application filed December 23, 1915. Serial No. 68,302.

*To all whom it may concern:*

Be it known that I, JAMES F. LINCOLN, a citizen of the United States of America, residing at Cleveland, Cuyahoga county, Ohio, have invented new and useful Arc-Welding Apparatus, of which the following is a specification.

This invention relates to electric current generation control.

This invention has utility when incorporated in a direct current generator, especially in arc welding apparatus.

Figure 2:
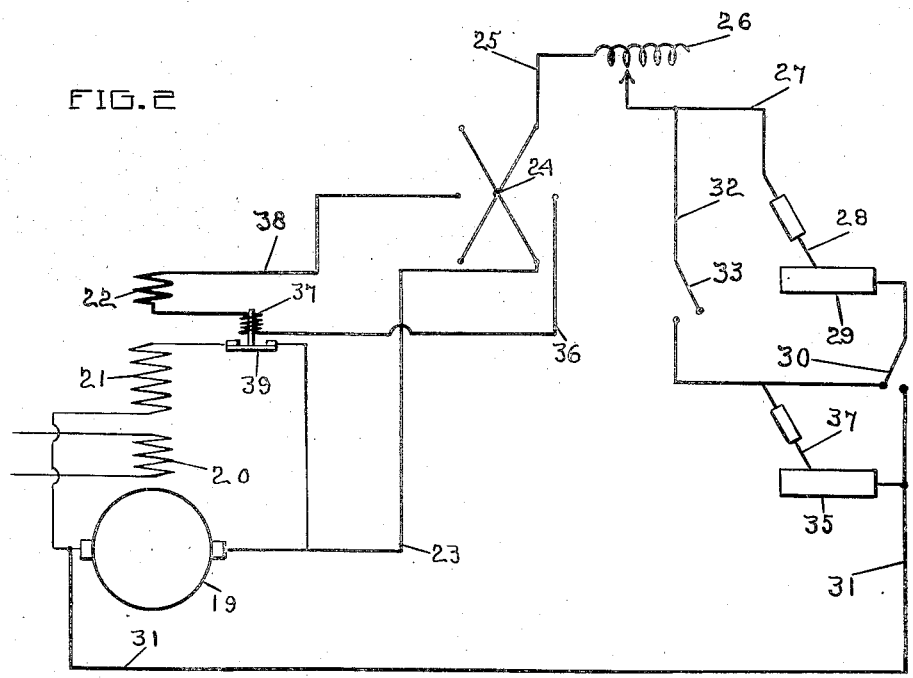

Referring to the drawings:

Figure 1 is a wiring diagram of an embodiment of the invention in an arc welding apparatus embodying a separately excited generator having a bucking series field; and Fig. 2 is a wiring diagram of an embodiment of the invention in an arc welding apparatus embodying a separately excited field, a shunt field, and a bucking series field.

The generator 1 has a lead 2 having therein a series field winding 3. In multiple with this field winding 3 is the adjustable resistance or carbon disk pile 4 operable to vary the strength of the current passing through the bucking series field winding 3. This current from the line 2 passes the winding 3 and through the conductor 5 to the work 6 with which may contact the electrode 7 for arc welding operation. The electrode 7 has the inductance 8 in its circuit to provide resistance to sudden current change arising from manual adjustments of the electrode 7 as to the work 6. The current then passes through line 9, series solenoid 10 and line 11 to the generator 1. This series solenoid 10 controls the switch 12 serving, when the solenoid is energized, to permit current flow from the outside source through the lead 13 and wire 14 to the separately excited field winding 15 for the generator 1 and thence return through the lead 16. When the main arcing circuit 2, 3, 5, 6, 7, 8, 9, 10, 11, is broken, say by lifting the electrode 7, the solenoid 10 is deënergized, the switch 12 falls, and the current instead of passing by leads 13, 14 to the shunt field winding 15, passes by the lead 17 through resistance 18 and thence through lead 14 to the shunt 15. There is, accordingly, an automatically reduced flow of current in the field winding 15 of the generator 1 whenever the bucking series field 3 ceases to act.

In practice it is desirable, say in some arc welding, to have the pressure at the arc say, 40 volts. For stabilizing machine operation there must be a capability of exceeding this 40 volt pressure to care for the variation in effective or working arc length. In a machine working say at 40 volts, it is desirable to have a pressure capability approximating say 70 volts. Accordingly, the separately excited field 15 may have this 70 volt capability when the resistance 18 is cut out. However, as this is a working advantage solely, the confining of the generator to this capability only when needed is a material item in reducing the initial rush of current. With the current load going off the generator, the arcing or working circuit resistance 18 herein reduces the field winding strength of the field 15 so that the generator approximates the working voltage for no load operation.

Similarly in the device of Fig. 2 the generator 19 has the separately excited field winding 20, a shunt field winding 21, and a bucking series field winding 22. The working or arcing circuit from the generator may pass through the lead 23 to the reverse switch 24, thence through the lead 25, the reactance 26, lead 27, to the electrode 28 to have arc coaction with the work 29 from which the current may pass through the switch 30 and lead 31 back to the generator 19. The line 32 with switch 33 closed may place the electrode 34 for arcing on the work 35. Further, with the switch 33 open, the switch 30 may be thrown away from the line 31 to place the arc between the electrode 28 and the work 29 in series with the arc between the electrode 34 and the work 35.

In special instances there may be occasion to run up the capacity of the machine and for this purpose the bucking series field 22 may have the current reversed therethrough by means of the switch 24, thereby compounding the generator.

Lead 36 has solenoid 37 therein on its way to the series field winding 22, the return lead 38 from which field winding 22 extends to the reversing switch 24, whereby the bucking series field 21 may be reversed to form a supplementing field.

The solenoid 37 controls the switch 39 so that with no current flow through the series winding 22 this solenoid 37 is deënergized, the switch 39 opens, and no current flows through the shunt field winding 21. However, with the series field acting, the solenoid 37 closes the switch 39 and the shunt field 21 is energized. The field winding strength of the generator 19 is accordingly supplemented or increased when the load or arcing circuit is on. In this generator wherein the current may be constant over a considerable range, the no load voltage is brought down to approximate the working voltage whether one or two arcs be in operation.

There is accordingly most effective generation as well as use of the electric energy. The generation at all times responds to the demand of either initiating an arc or carrying the load of the arc or work.

The reactance contributes to efficiency in operation in checking the quick changes of current, especially the rush when a short circuit occurs at the forming of the arc. This latter rush is materially cut down by reducing the initial voltage herein shown as automatically provided for in the reduction of the strength of the generator field on no load.

What is claimed and it is desired to secure by Letters Patent is:

1. The combination of a generator and a work circuit including a solenoid, a series field winding for the generator, and additional field winding means opposing said series field winding and including a field winding circuit having a switch controlled by said solenoid, said switch operable as the work circuit load increases to increase the field winding strength opposing the series field winding.

2. The combination of a generator and a work circuit including a solenoid, a series field winding for the generator, shunt field winding means for the generator opposing the series field winding means for varying the strength of the shunt field winding means including a switch operable by said solenoid as the series field increases for increasing the shunt field winding means.

3. The combination of a generator and a work circuit including a solenoid, a series field winding for the generator, a shunt field winding for the generator opposing the series field winding, and means for varying the strength of the shunt field winding including a switch operable by said solenoid as the work circuit load increases for increasing the shunt field winding strength.

4. The combination of a generator and a work circuit including a series solenoid and a reactance coöperating with said solenoid for dampening the solenoid action, a series field winding for the generator, a shunt field winding for the generator opposing the series field winding and a switch controlled by said solenoid for automatically and arbitrarily stepping up the load voltage range of the generator in a determined range over the no load voltage of said generator.

In witness whereof I affix my signature.

JAMES F. LINCOLN.